United States Patent
Tokumoto

(10) Patent No.: US 10,002,459 B2
(45) Date of Patent: Jun. 19, 2018

(54) IMAGE PROCESSING APPARATUS

(71) Applicant: CANON KABUSHIKI KAISHA, Tokyo (JP)

(72) Inventor: Hirokazu Tokumoto, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 98 days.

(21) Appl. No.: 14/937,162

(22) Filed: Nov. 10, 2015

(65) Prior Publication Data
US 2016/0133046 A1 May 12, 2016

(30) Foreign Application Priority Data
Nov. 12, 2014 (JP) ................................. 2014-229911

(51) Int. Cl.
G06T 11/60 (2006.01)
G06T 15/50 (2011.01)

(52) U.S. Cl.
CPC ............ G06T 15/503 (2013.01); G06T 11/60 (2013.01)

(58) Field of Classification Search
None
See application file for complete search history.

(56) References Cited

U.S. PATENT DOCUMENTS

| 6,023,302 A * | 2/2000 | MacInnis ................. H04N 9/75 348/586 |
| 2008/0122868 A1* | 5/2008 | Mizutani ................ G06T 11/60 345/629 |
| 2011/0038004 A1* | 2/2011 | Oishi ................. G06K 15/1826 358/1.15 |
| 2011/0255777 A1* | 10/2011 | Matsuoka .......... H04N 1/40062 382/164 |
| 2012/0229603 A1* | 9/2012 | Bruls ................. H04N 13/0048 348/43 |
| 2013/0050527 A1* | 2/2013 | Nakajima ............... G06T 13/80 348/231.99 |
| 2013/0121569 A1* | 5/2013 | Yadav ....................... G06T 5/50 382/164 |
| 2014/0169666 A1* | 6/2014 | Hong .................... G06T 15/503 382/162 |

FOREIGN PATENT DOCUMENTS

JP 2006-244248 A 9/2006

* cited by examiner

Primary Examiner — Tize Ma
(74) Attorney, Agent, or Firm — Canon U.S.A., Inc. IP Division

(57) ABSTRACT

An image processing apparatus includes an acquisition unit configured to acquire a bitmap image in which each of contained pixels has an alpha value indicating opacity of this pixel, and a rendering unit configured to render the bitmap image. The rendering unit is configured to, when rendering the bitmap image, refrain from performing alpha blending on a pixel contained in the bitmap image that has a specific alpha value and perform the alpha blending on a pixel contained in the bitmap image that has a different alpha value from the specific alpha value.

20 Claims, 8 Drawing Sheets

FIG.3A
PDL COMMAND
*300*
```
<Path Data="M 50,0 L 250,0 250, 50, 0,50 z">
   <Path.Fill>
      <ImageBrush ImageSource="/Documents/1/Resources/Images/1-1.PNG"
ViewBox="50,0,250,50" TileMode="None" ViewboxUnits="Absolute" ViewportUnits="Absolute"
Viewport="50,0,50,250"/>
   </Path.Fill>
</Path>
```
FIG.3B
RENDERING COMMAND
*310*
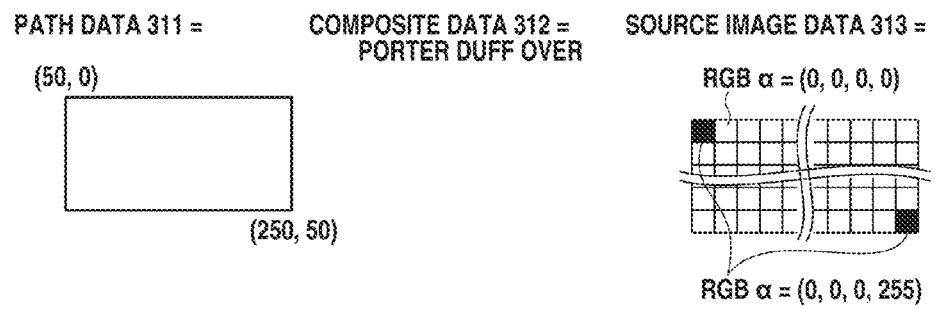
FIG.3C
DISPLAY LIST
*320*
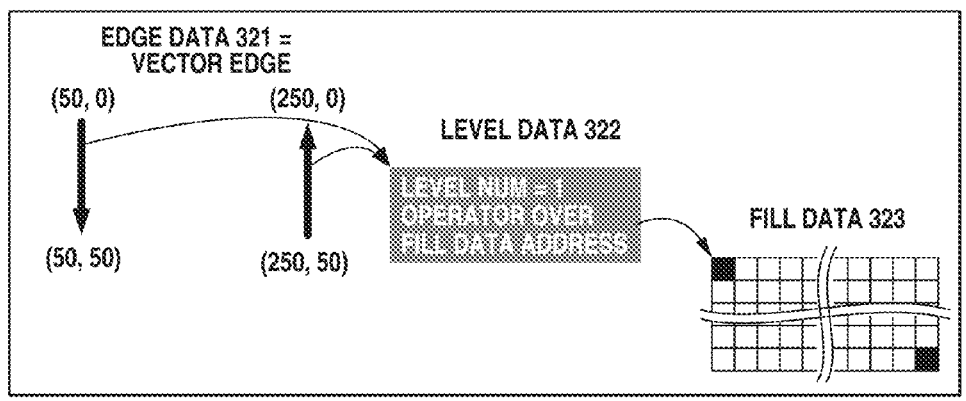

RENDERING COMMAND

DISPLAY LIST

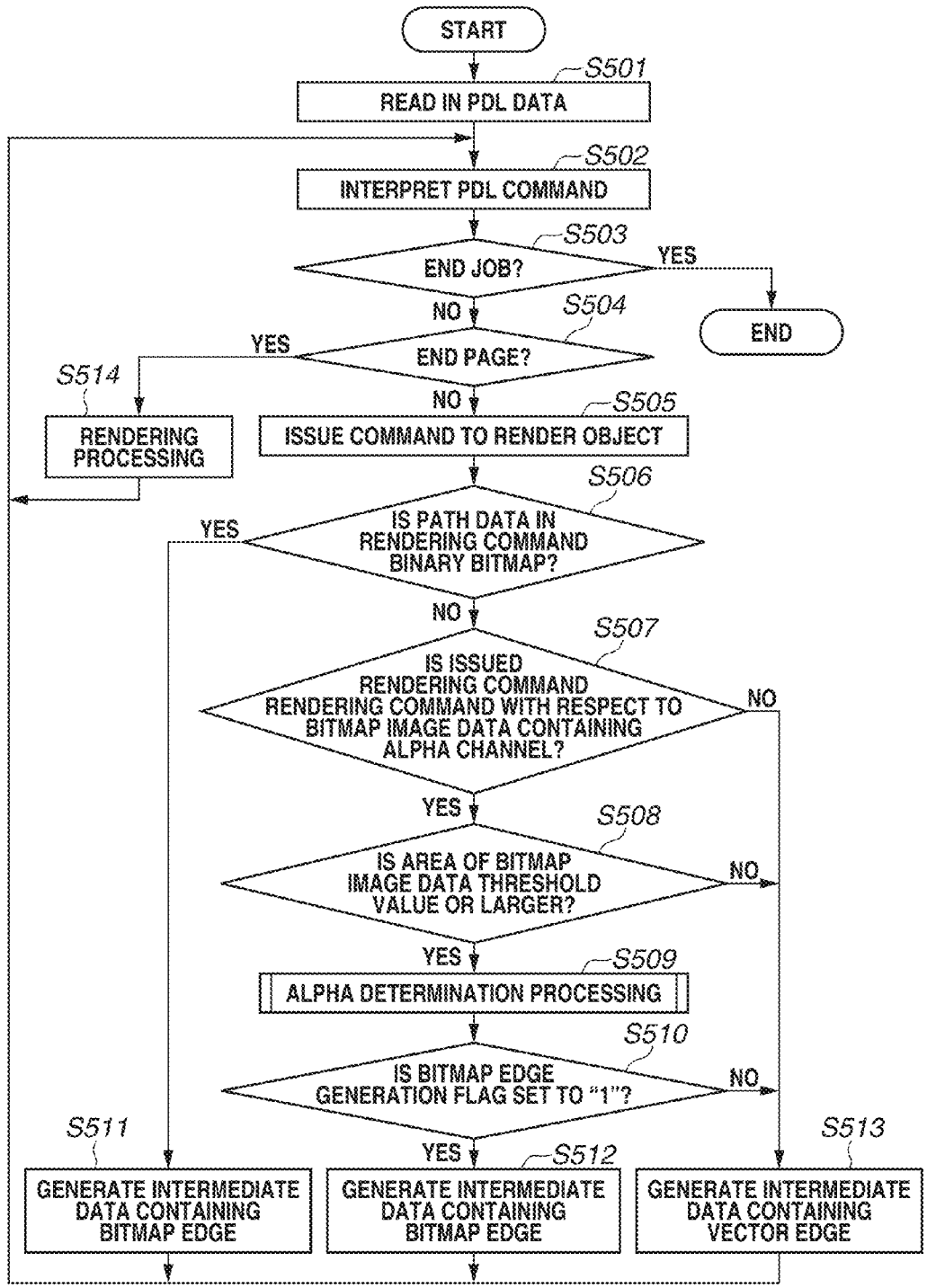

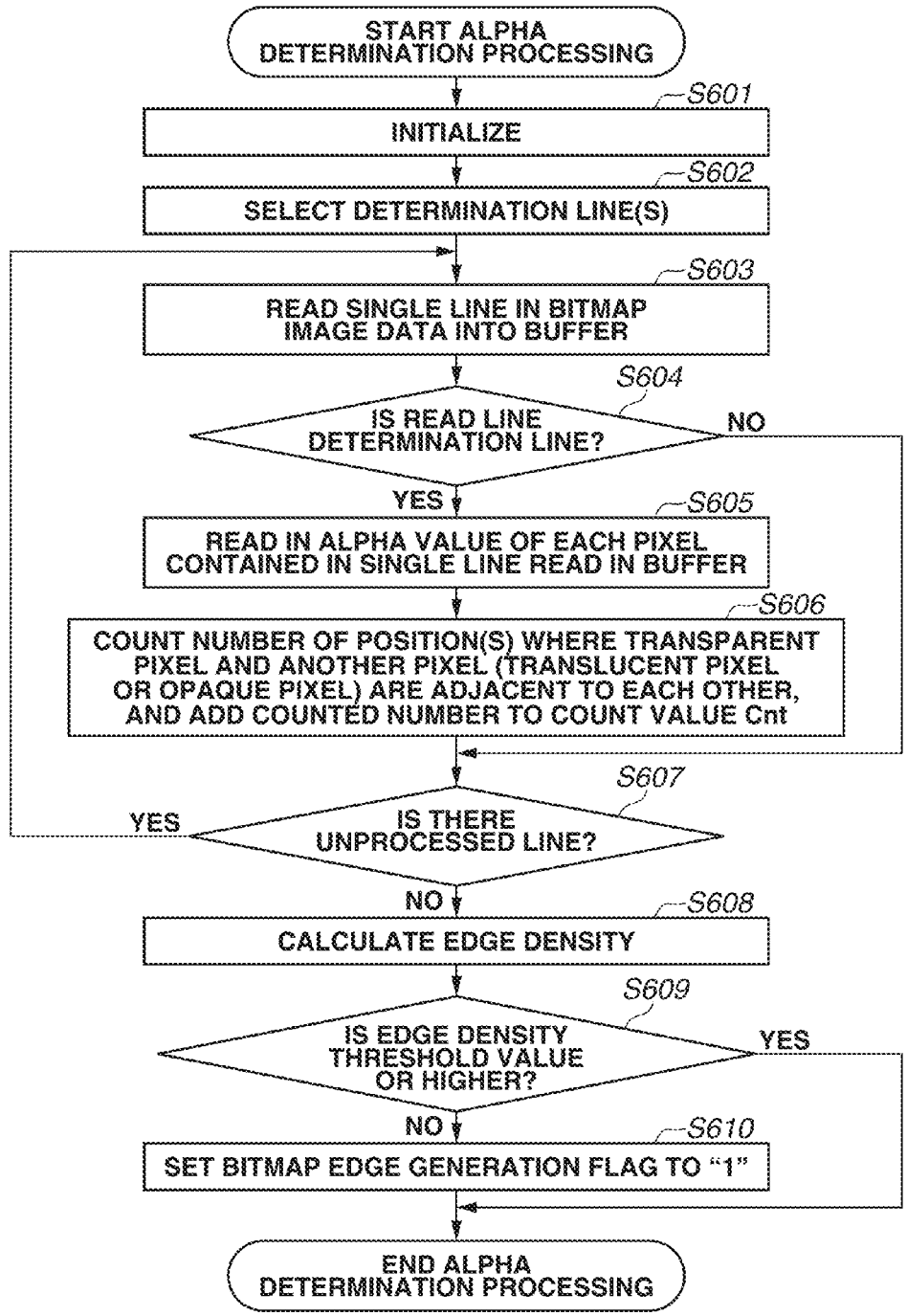

EDGES 801 GENERATED IN RENDERING PROCESSING

EDGES 802 GENERATED IN RENDERING PROCESSING

EDGES 803 GENERATED IN RENDERING PROCESSING

IMAGE PROCESSING APPARATUS

BACKGROUND OF THE INVENTION

Field of the Invention

The present invention relates to a technique for processing image data containing an alpha channel.

Description of the Related Art

In recent years, image data in the Portable Network Graphics (PNG) format has been becoming widely handled. The image data in the PNG format is bitmap image data containing, for each pixel, a color value (for example, a Red/Green/Blue (RGB) value) of a pixel, and an alpha value (an α value) that expresses opacity (transparency) of this pixel.

Image data containing a plurality of pixels each having an α value is rendered by alpha (α) blending when being rendered on a foreground (i.e., on top of a background). The α blending is a method that combines a pixel (or an image) having an opacity with another image based on this opacity. Rendering by a common type of the α blending is rendering processing that combines the color value held by the pixel to be rendered on the foreground with the color value held by the background pixel based on the α value of this foreground pixel (i.e., processing that calculates a weighted average of them). For example, if a transparent pixel (a pixel having an α value indicating that this pixel is transparent (completely transparent)) is rendered on the foreground, a pixel resulting from the rendering processing by the α blending has a color value held by the background pixel. On the other hand, for example, if an opaque pixel (a pixel having an α value indicating that this pixel is opaque (completely opaque)) is rendered on the foreground, a pixel resulting from the rendering processing by the α blending has a color value held by the foreground pixel.

The rendering processing by the α blending requires a large amount of calculation due to the above-described processing that combines the color values. Therefore, Japanese Patent Application Laid-Open No. 2006-244248 aims at speeding up the rendering by omitting the α blending for all pixels in image data, if the individual pixels contained in the image data are constituted by either the transparent pixels or the opaque pixels.

In other words, according to Japanese Patent Application Laid-Open No. 2006-244248, the α blending is omitted, if the image data is constituted by only the transparent pixels or only the opaque pixels.

SUMMARY OF THE INVENTION

According to an aspect of the present invention, an image processing apparatus includes an acquisition unit configured to acquire a bitmap image including a plurality of pixels, each of the plurality of the pixels having an alpha value indicating an opacity of the pixel, and a rendering unit configured to perform a rendering of the bitmap image using alpha blending, wherein, in the rendering of the bitmap image by the rendering unit, alpha blending is not performed on a pixel of the plurality of the pixels that has a specific alpha value but is performed on a pixel of the plurality of the pixels that has a different alpha value than the specific alpha value.

Further features of the present invention will become apparent from the following description of exemplary embodiments with reference to the attached renderings.

BRIEF DESCRIPTION OF THE DRAWINGS

FIGS. 3A, 3B, and 3C illustrate a Page Description Language (PDL) command, a rendering command, and a display list, respectively.

FIG. 5 is a flowchart from PDL interpretation processing to rendering processing according to the first exemplary embodiment.

FIG. 6 is a flowchart of α determination processing according to the first exemplary embodiment.

DESCRIPTION OF THE EMBODIMENTS

An alpha (α) value indicates an opacity that a pixel has.

A transparent (completely transparent) pixel is a pixel having the α value indicating that this pixel is transparent (completely transparent) (for example, 0, which is a minimum value). A color value acquired by rendering the transparent pixel on a background pixel with use of an alpha blending (an α blending) is a color value of this background pixel. In other words, the result of rendering the transparent pixel can be regarded as a pixel that is not rendered.

A translucent pixel is a pixel having an α value indicating that this pixel is translucent (semi-transparent) (for example, 1 or larger, and 254 or smaller). A color value acquired by rendering the translucent pixel on the background pixel with use of the α blending is a value calculated by combining a color value of this translucent pixel and a color value of this background pixel.

An opaque (completely opaque) pixel is a pixel having the α value indicating that this pixel is opaque (completely opaque) (for example, 255, which is a maximum value). A color value acquired by rendering the opaque pixel on the background pixel with use of the α blending is a color value of this opaque pixel. In other words, the result of rendering the opaque pixel can be regarded as a pixel rendered while the background pixel is overwritten therewith.

A term "non-transparent pixel" will be used to collectively refer to the translucent pixel and the opaque pixel. In other words, the non-transparent pixel can be regarded as a rendered pixel.

The α blending is the method that, assuming that a pixel to be rendered becomes the foreground and a pixel in another image becomes the background, combines the foreground pixel with the background pixel based on the α value held by the foreground pixel. A color value acquired from the rendering by the common type of the α blending is a sum of the color value held by the foreground pixel that is multiplied by (the α value/the maximum value of the α value), and the color value held by the background pixel that is multiplied by (1−(the α value/the maximum value of the α value)).

In the following description, an exemplary embodiment for embodying the present invention will be described with reference to the drawings.

When a term "binary bitmap" is used in the following description, the binary bitmap refers to bitmap image data expressed by one bit per pixel.

Figure 1:
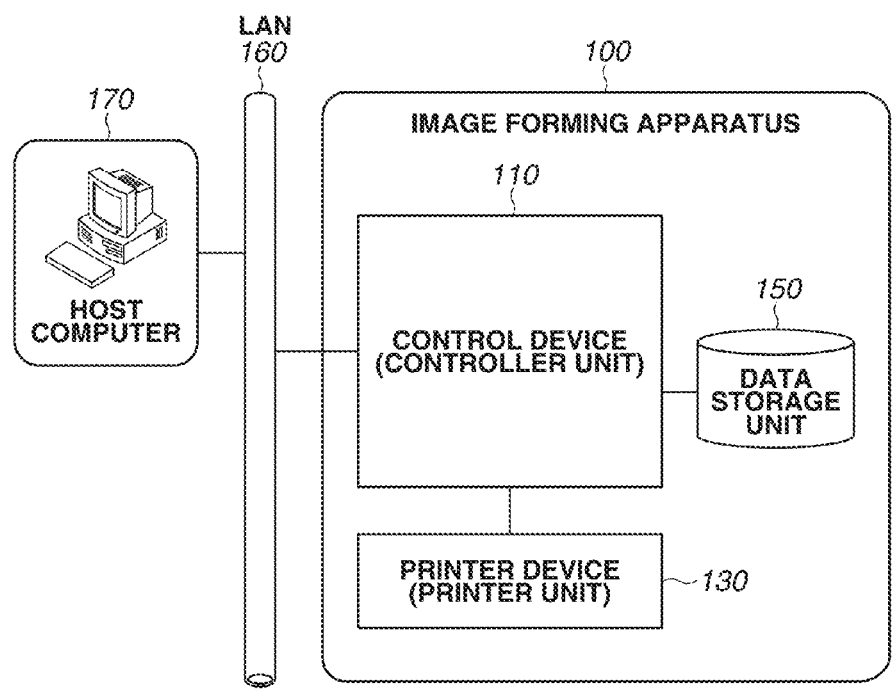
FIG. 1 is a hardware block diagram of an image processing apparatus according to a first exemplary embodiment.

FIG. 1 is a hardware block diagram illustrating an image processing apparatus according to the present exemplary embodiment. In the present exemplary embodiment, an image forming apparatus 100 will be described as one example of the image processing apparatus. This image forming apparatus 100 may be a multi function peripheral (MFP), or may be a single function printer (SFP).

The image forming apparatus 100 communicates with a host computer (for example, a personal computer) 170 via a local area network (LAN) 160, such as Ethernet®.

The above-described image forming apparatus 100 includes a control device (a controller unit) 110, a printer device (a printer unit) 130, a data storage unit 150, and a not-illustrated network interface (I/F). The control device 110 controls the printer device 130 and the data storage unit 150.

The control device 110 includes a central processing unit (CPU), a read only memory (ROM), and a random access memory (RAM), which are not illustrated. This CPU comprehensively controls the entire image forming apparatus 100 by loading a program stored in this ROM or the data storage unit 150 into this RAM and executing the loaded program. This execution of the program by the CPU causes the control device 110 to perform Page Description Language (PDL) reception processing, PDL interpretation processing, intermediate data generation processing, and rendering processing.

The control device 110 receives page description language (PDL) data (print data) written in a PDL, such as Extensible Markup Language (XML) Paper Specification (XPS) and PostScript, from the host computer 170 via the above-described network I/F, and stores the received PDL data into the data storage unit 150. The data storage unit 150 is, for example, a hard disk drive (HDD) or a solid state drive (SSD). The control device 110 performs the PDL interpretation processing on the stored PDL data, and performs the intermediate data generation processing based on a result of this interpretation. As a result of the intermediate data generation processing, intermediate data called a display list is generated as much as the number of page(s). Then, the control device 110 generates bitmap image data of a page by performing the rendering processing for each page based on the generated intermediate data. The control device 110 stores the generated bitmap image data into the data storage unit 150. And then, the control device 110 supplies such stored bitmap image data to the printer device 130.

In the present exemplary embodiment, the CPU in the control device 110 performs the rendering processing, but the present exemplary embodiment may be configured in such a manner that a raster image processor (RIP) is provided in the control device 110 as another processor than the CPU, and this RIP performs the rendering processing.

The printer device 130 prints an image onto a recording medium (for example, paper and an overhead projector (OHP) sheet) based on the bitmap image data supplied from the control device 110. A print method of this printer device 130 may be any of various kinds of print methods, such as an electrophotographic method and an inkjet method.

Figure 2:
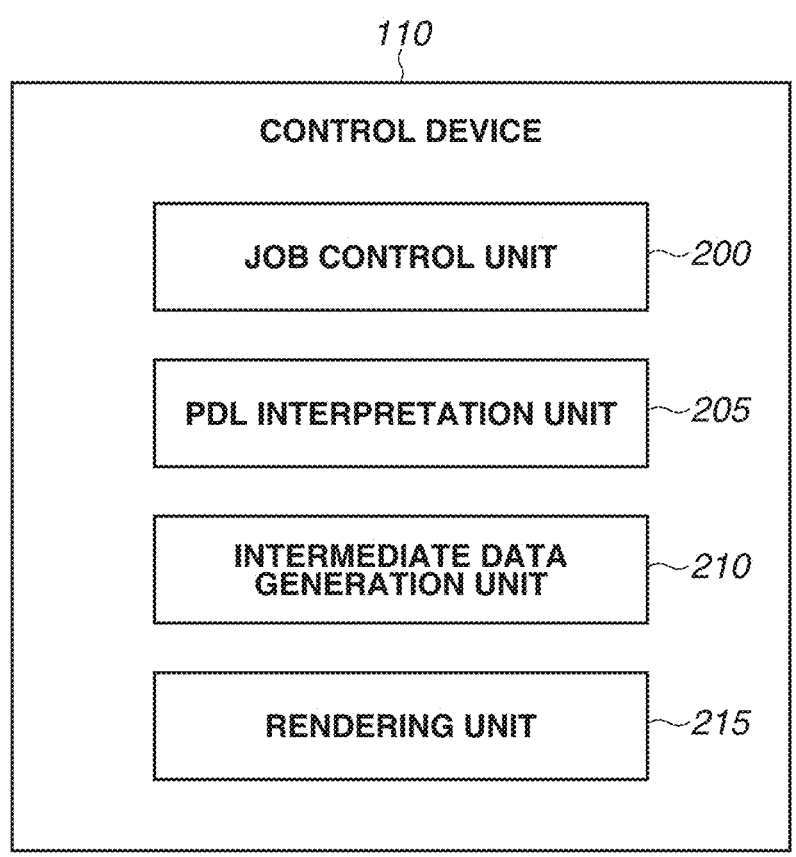
FIG. 2 is a software block diagram of the image processing apparatus according to the first exemplary embodiment.

FIG. 2 is a block diagram illustrating one example of a software module diagram that is realized by the execution of the above-described program by the not-illustrated CPU in the control device 110 according to the present exemplary embodiment.

A job control unit 200 receives the PDL data generated by the host computer 170 via the LAN 160, and stores the received PDL data into the data storage unit 150. Then, the job control unit 200 instructs a PDL interpretation unit 205, an intermediate data generation unit 210, and a rendering unit 215 to start processing.

After receiving the instruction to start the processing from the job control unit 200, the PDL interpretation unit 205 interprets the PDL data stored in the data storage unit 150, and issues a rendering command based on this interpretation to the intermediate data generation unit 210. This PDL interpretation unit 205 can interpret, for example, the PDL data (the print data) written in PostScript or XPS.

After receiving the instruction to start the processing from the job control unit 200, the intermediate data generation unit 210 generates the intermediate data from the rendering command issued from the PDL interpretation unit 205, and stores the generated intermediate data into the RAM in the control device 110. Such intermediate data generation processing will be described below in detail with reference to FIG. 6.

When the intermediate data corresponding to a single page is stored into the RAM by the intermediate data generation unit 210, the rendering unit 215 reads in the intermediate data from this RAM after receiving the instruction to start the processing from the job control unit 200. Then, the rendering unit 215 performs the rendering processing based on this intermediate data, thereby rendering the bitmap image data corresponding to the single page into the RAM. Rendering the bitmap image data corresponding to the single page into the RAM means writing an RGB value of a pixel contained in this page into a corresponding address in the RAM. The rendering unit 215 stores the bitmap image data corresponding to the single page in the RAM into the data storage unit 150. Such bitmap image data stored in the data storage unit 150 is supplied to the printer device 130 by the job control unit 200.

FIGS. 3A to 3C are schematic diagrams illustrating the PDL data, the rendering command issued based on the interpretation of this PDL data, and the intermediate data generated from this rendering command. Especially, a vector edge (which will be described below) will be described with reference to FIGS. 3A to 3C.

<Vector Edge>

FIG. 3A illustrates an example of the PDL data generated by the host computer 170. For example, the PDL data indicates a command to render an object (a PDL command) 300 written in XPS. Path elements of XPS are written in this PDL command 300. The written contents are commands such as a command specifying a region to be rendered, and a command to paint (brush) the inside of this region. More specifically, specifying the region to be rendered as a path indicating a rectangle, and painting the inside of this rectangular region with bitmap image data (1-1.PNG) in the PNG format are written in the PDL command 300 illustrated in FIG. 3A. This bitmap image data in the PNG format is the image data containing an alpha channel (an α channel). In other words, the image data has channels of three color values indicating respective luminances of a red (R) color, a green (G) color, and a blue (B) color, and the single a channel indicating opacity, i.e., four channels in total, and each pixel has the RGB value and the α value (i.e., the RGBα value). In the present exemplary embodiment, each of the channels is expressed by 8 bits. For example, a pixel having an RGBα value=(0, 0, 0, 255) is an opaque black pixel, and a pixel having an RGBα value=(0, 0, 0, 0) is a transparent black pixel. Further, a pixel having an α value of 1 or larger and 254 or smaller is a translucent pixel. For example, a pixel having an RGBα value=(0, 0, 0, 128) is a translucent black pixel.

FIG. 3B illustrates a rendering command 310 that is issued by the interpretation of the PDL command 300 illustrated in FIG. 3A by the PDL interpretation unit 205.

The rendering command 310 contains path data 311, composite data 312, and source image data 313.

The path data 311 contains coordinate data indicating the region of an object to be rendered. This coordinate data is upper left coordinates (50, 0) and lower right coordinates (250, 50) of the region of the object to be rendered.

The composite data 312 indicates that a method for combining the object to be rendered with a background object is the Over method in the Porter-Duff technique.

The source image data 313 indicates that the inside of the region of the object to be rendered will be painted with the image data "1-1.PNG". The image data "1-1.PNG" in the present example is bitmap image data having a height of 50 pixels and a width of 200 pixels as indicated by the source image data 313 illustrated in FIG. 3B. An upper left pixel and a lower right pixel of this bitmap image data each have the RGBα value (0, 0, 0, 255), and the other pixels each have the RGBα value (0, 0, 0, 0). In other words, the upper left pixel and the lower right pixel are opaque, and the other pixels are transparent.

Types of the path data in the rendering command also include path data containing a binary bitmap, besides the path data containing the coordinate data like the above-described path data. The path data containing the binary bitmap will be described below with reference to FIG. 4.

FIG. 3C illustrates one example of a display list (intermediate data) 320 generated by the intermediate data generation unit 210 from the rendering command 310 illustrated in FIG. 3B. The display list 320 contains edge data 321, level data 322, and fill data 323. These data pieces have such a list structure that the fill data 323 is referred to from the level data 322, and the level data 322 is referred to from the edge data 321. The rendering unit 215 performs the rendering processing of the page while reading in the edge data 321 from the display list 320, and referring to the level data 322 and the fill data 323 sequentially.

The edge data 321 is generated from the path data 311 in the rendering command 310. Since the path data 311 in the present example contains the coordinate data, the type of the generated edge data 321 is a vector edge. The vector edge is a pair of downward and upward edges. Each edge of the downward and upward edges indicates an end of the region of the object to be rendered. The downward edge contained in the edge data 321 illustrated in FIG. 3C indicates a left end of the rectangular object as a vector connecting coordinates (50, 0) and (50, 50). The upward edge indicates a right end of the rectangular objet as a vector connecting coordinates (250, 0) and (250, 50). A region (a sector) on a scan line sandwiched between a downward edge and an upward edge of an object is a region where this object will be rendered (an active region), and another region is an inactive region with respect to this object.

The level data 322 contains a level number indicating an order in which the object to be rendered will be overlaid, an operator indicating a method for combining this object with the background, and a fill data address indicating how the inside of the region of the object will be painted. The level number illustrated in FIG. 3C is "1", which indicates that this object will be rendered on a lowermost layer in the overlaying order. The operator illustrated in FIG. 3C is "Over", which corresponds to the composite data 312. The fill data address illustrated in FIG. 3C is an address for referring to the fill data 323.

The fill data 323 indicates the image data that will be used to paint the inside of the region of the object to be rendered. The image data indicated by the fill data 323 illustrated in FIG. 3C is the same as the source image data 313 (1-1.PNG).

The rendering processing by the rendering unit 215 based on the display list containing the above-described vector edge is performed on all pixels in the active region indicated by the vector edge (i.e., all pixels in the object). In other words, each of the pixels in the active region is rendered based on the image data indicated by the fill data and the combining method indicated by the level data.

Especially, in the case where the bitmap image data containing pixels each having the α value is rendered with use of the vector edge, the rendering unit 215 identifies the entire region to be rendered in this image data as the active region based on the vector edge. Then, the rendering unit 215 renders each of the pixels in the image data by the α blending based on the α value held by each of the pixels without detecting a boundary between a pixel to be rendered and a pixel to be not rendered in the bitmap image data. On the contrary, the rendering unit 215 does not perform such rendering processing on pixels in the inactive region. As a result, the rendering processing on the inactive region can be omitted, which contributes to speeding up the processing for rendering the page.

For example, in the rendering processing based on the display list 320, since the image data indicated by the fill data 323 contains the pixel having the α value, the α blending between this pixel and the background pixel is performed on each of the pixels in the active region. Then, in the image data indicated by the fill data 323 in the display list 320, the pixels are transparent except for the upper left and lower right pixels, so that the α blending performed on the transparent pixels ends up wasteful processing. This is because the same result can be acquired by only outputting the color value of the background pixel directly without performing the α blending.

<Bitmap Edge>

In the case where the path data in the rendering command contains the binary bitmap, a generated display list is different than the display list 320. More specifically, the type of the edge data contained in the display list is a bitmap edge (which will be described below). This bitmap edge will be described with reference to FIGS. 4A to 4C.

Figure 4A:
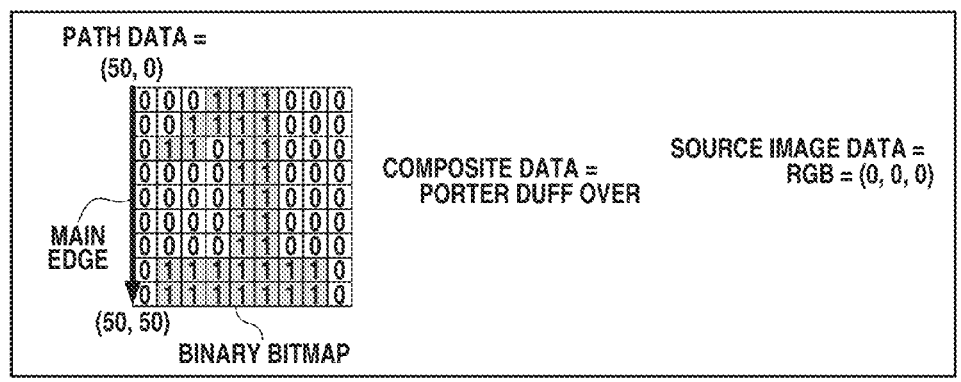
FIGS. 4A, 4B, and 4C illustrate a bitmap edge.

The binary bitmap contained in the path data is, for example, a binary bitmap configured as illustrated in FIG. 4A. In the binary bitmap illustrated in FIG. 4A, a contour of a character is defined by positions of bits (bit values) set to "1", and the contour of the character indicates the number "1". Pixels having the bits set to "1" are painted with the image data specified in the source image data. For example, if the source image data is an RGB value (0, 0, 0), the pixels having the bits set to "1" are painted black. Further, the path data also contains data indicating coordinates of a left end of the binary bitmap that is called a main edge, besides the binary bitmap. In the case of the path data containing the binary bitmap configured as described above, the binary bitmap is contained in the bitmap edge.

Figure 4B:
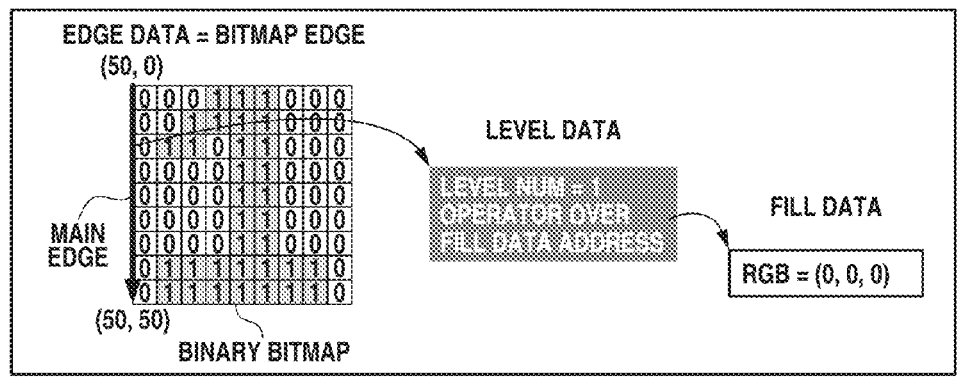

A display list illustrated in FIG. 4B is generated from such a rendering command. More specifically, the edge data that is the bitmap edge is generated. The bitmap edge contains the main edge indicating the coordinate positions of the left end of the object, and the binary bitmap. Level data illustrated in FIG. 4B is referred to from this bitmap edge, and fill data is referred to from this level data. The content of the level data is similar to the level data 322. Further, this fill data is a monochrome fill, and is generated from the source image data contained in the rendering command. In the present example, the fill data is the black color indicated by the RGB value (0, 0, 0).

Figure 4C:
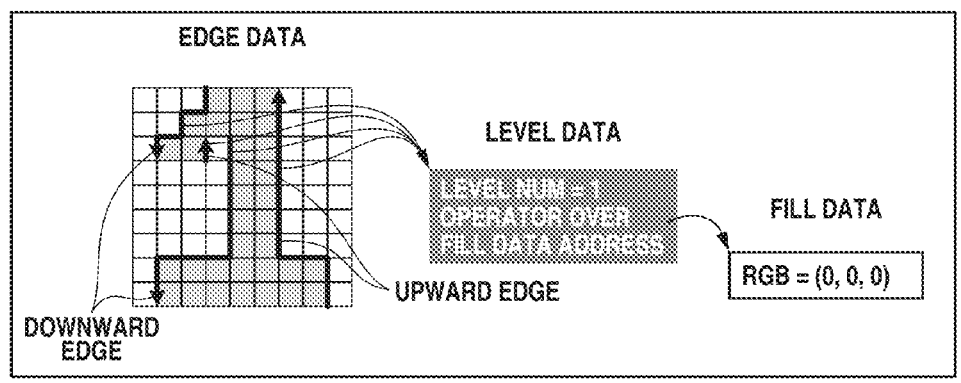

The rendering processing performed based on the display list containing the bitmap edge generated in this manner will be described. Upon acquiring the display list containing the bitmap edge, the rendering unit 215 detects switching of a bit from the binary bitmap contained in the bitmap edge. A position of this switching indicates, i.e., a boundary position between the transparent pixel (i.e., the pixel to be not rendered) and the non-transparent pixel (the pixel to be rendered). Then, the rendering unit 215 generates a downward edge and an upward edge based on a result of such detection. The downward edge is generated at a position contained in the binary bitmap where the pixel is switched from the pixel having the bit set "0" to the pixel having the bit set to "1" (the boundary position). The upward edge is generated at a position contained in the binary bitmap where the pixel is switched from the pixel having the bit set to "1" to the pixel having the bit set to "0" (the boundary position). The generated edges are illustrated in FIG. 4C. As understood from edge data illustrated in FIG. 4C, two downward edges and two upward edges are generated from the bitmap edge. The rendering unit 215 performs the rendering processing based on the level data and the fill data on each of the pixels in the active region sandwiched between the downward edge and the upward edge, similarly to the rendering processing performed based on the display list 320. On the other hand, the rendering unit 215 does not perform the rendering processing on the pixels in the inactive region. Therefore, for example, if the image data indicated by the fill data contains the pixel having the α value, the rendering unit 215 performs the α blending on the pixels in the active region but does not perform the α blending on the pixels in the inactive region.

Further, the rendering unit 215 may identify the opaque pixel (or region) in the active region, and render this pixel (or region) by overwriting the background with this pixel without use of the α blending to further omit the α blending.

Generating the edge data as the bitmap edge in this manner allows the rendering processing to be partially omitted, although requiring a cost to process the edge in the rendering processing. Therefore, performing the rendering processing with use of the bitmap edge can be expected to be sped up compared to performing the rendering processing with use of the vector edge, when rendering an object having a portion where the transparent pixels exist in a cluster.

<Generation of Display List>

FIG. 5 is a flowchart illustrating the intermediate data (display list) generation processing performed by the control device 110 according to the present exemplary embodiment. This flow is performed by the software modules realized by the execution of the above-described program by the not-illustrated CPU in the control device 110. The job control unit 200 instructs the PDL interpretation unit 205, the intermediate data generation unit 210, and the rendering unit 215 to start the processing, according to which the processing of this flow starts.

In step S501, the PDL interpretation unit 205 reads in the PDL data stored in the data storage unit 150. Then, the processing proceeds to step S502. The PDL data read at this time contains a plurality of PDL commands. This plurality of PDL commands includes PDL commands such as commands to start a job, start a page, end the page, and end the job, and the PDL command instructing the image forming apparatus 100 to render an object.

In step S502, the PDL interpretation unit 205 acquires one of PDL commands that are not yet interpreted, sequentially, starting from a head of the PDL data, as a PDL command set as a processing target. The PDL interpretation unit 205 interprets the PDL command set as the processing target. Then, the processing proceeds to step S503.

In step S503, the PDL interpretation unit 205 determines whether the PDL command set as the processing target is the command to end the job. If the PDL command set as the processing target is the command to end the job (YES in step S503), the processing illustrated in the present flowchart ends. If not (NO in step S503), the processing proceeds to step S504.

In step S504, the PDL interpretation unit 205 determines whether the PDL command set as the processing target is the command to end the page. If the PDL command set as the processing target is the command to end the page (YES in step S504), the processing proceeds to step S514. If not (NO in step S504), this means that the PDL command set as the processing target is the PDL command to instruct the image forming apparatus 100 to render the object, so that the processing proceeds to step S505.

In step S505, the PDL interpretation unit 205 generates a command to render the object based on the interpretation of the PDL command set as the processing target. Then, the PDL interpretation unit 205 issues this rendering command to the intermediate data generation unit 210. Then, the processing proceeds to step S506.

In step S506, the intermediate data generation unit 210 determines whether the path data in the issued rendering command contains a binary bitmap. If the path data contains a binary bitmap (for example, FIG. 4A) (YES in step S506), the processing proceeds to step S511. If the path data does not contain a binary bitmap but contains coordinate data (for example, FIG. 3B) (NO in step S506), the processing proceeds to step S507.

In step S507, the intermediate data generation unit 210 determines whether the rendering command issued in step S505 is a rendering command with respect to the bitmap image data containing an α channel. More specifically, the intermediate data generation unit 210 makes such determination by checking the fill data in the rendering command.

For example, if the bitmap image data containing an α channel (for example, the bitmap image data in the PNG format that contains an α channel) is specified in the fill data, the intermediate data generation unit 210 determines that the rendering command is the rendering command with respect to the bitmap image data containing an α channel (YES in step S507). Then, the processing proceeds to step S508.

On the other hand, for example, if an opaque monochrome fill that does not contain an α value is specified in the fill data, the intermediate data generation unit 210 determines that the rendering command is not the rendering command with respect to the bitmap image data containing an α channel (NO in step S507). Then, the processing proceeds to step S513.

In step S508, the intermediate data generation unit 210 determines whether an area of the bitmap image data specified in the fill data in step S507 is a threshold value or larger. If the area of the bitmap image data is the threshold value or larger (YES in step S508), the processing proceeds to step S509. If not (NO in step S508), the processing proceeds to step S513. The intermediate data generation unit 210 makes such determination for the following reasons.

A calculation amount of combining processing (the α blending) is not so great even when the combining processing is performed on each pixel in the bitmap image data having an area smaller than the threshold value. On the other hand, when such bitmap image data is subject to alpha (α) determination processing in step S509, which will be described below, the determination processing takes a greater calculation amount. Another reason is that, even if the display list containing the bitmap edge is generated from the image data having a small area, the edge is generated in the rendering processing and the calculation amount increases when the edge is processed, so that the rendering processing cannot be expected to be sped up so much.

Therefore, the intermediate data generation unit 210 does not perform the α determination processing in step S509 on the bitmap image data having an area smaller than the threshold value, and then the processing proceeds to step S513.

In step S509, the intermediate data generation unit 210 performs the α determination processing. In the α determination processing, the intermediate data generation unit 210 analyzes the bitmap image data containing the α channel, and sets a bitmap edge generation flag based on this analysis. For example, if the source image data is image data 701 illustrated in FIG. 7A, the bitmap edge generation flag is set to "1". If the source image data is image data 702 illustrated in FIG. 7A, the bitmap edge generation flag is set to "0". The image data 701 is equivalent to the source image data 313. Further, the image data 702 is grid-like image data having a height of 50 pixels and a width of 200 pixels with the transparent pixel and the opaque pixel alternately arranged. Such a determination processing will be described below with reference to FIG. 6. Then, the processing proceeds to step S510.

In step S510, the intermediate data generation unit 210 determines whether the bitmap edge generation flag is set to "1". If the bitmap edge generation flag is set to "1" (YES in step S510), the processing proceeds to step S512. If not (NO in step S510), the processing proceeds to step S513.

In step S511, the intermediate data generation unit 210 generates the intermediate data containing the bitmap edge like the bitmap edge illustrated in FIG. 4B.

In step S512, the intermediate data generation unit 210 generates the intermediate data containing the bitmap edge based on the α channel (the α value of each of the pixels) contained in the image data. As will be described below, the intermediate data generation unit 210 generates the intermediate data containing the bitmap edge based on the α channel (the α value of each of the pixels), which causes the rendering unit 215 to exhibit the following behavior in step S514. That is, the rendering unit 215 omits the rendering itself for a pixel having a specific α value (the α value indicating that this pixel is transparent), and renders a pixel having another α value than that (the α value indicating that this pixel is translucent or opaque) with use of the α blending. Rephrasing that from another viewpoint, the generation of the bitmap edge by step S512 allows the rendering unit 215 to perform the following processing: (1) processing for dividing pixels into the pixel (region) that has to be rendered and the pixel (region) that does not have to be rendered from each other, and (2) processing for rendering the pixel (region) that has to be rendered with use of the α blending.

Figure 7A:
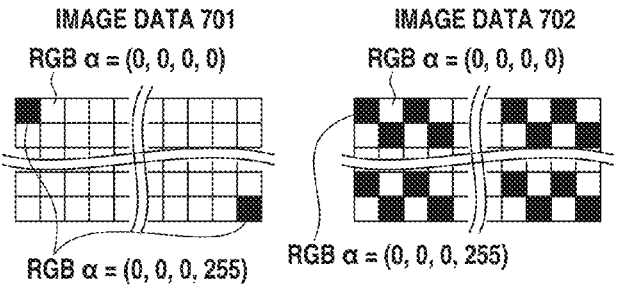
FIGS. 7A, 7B, and 7C illustrate display lists each containing the bitmap edge that is generated from image data containing an α channel.
Figure 7B:
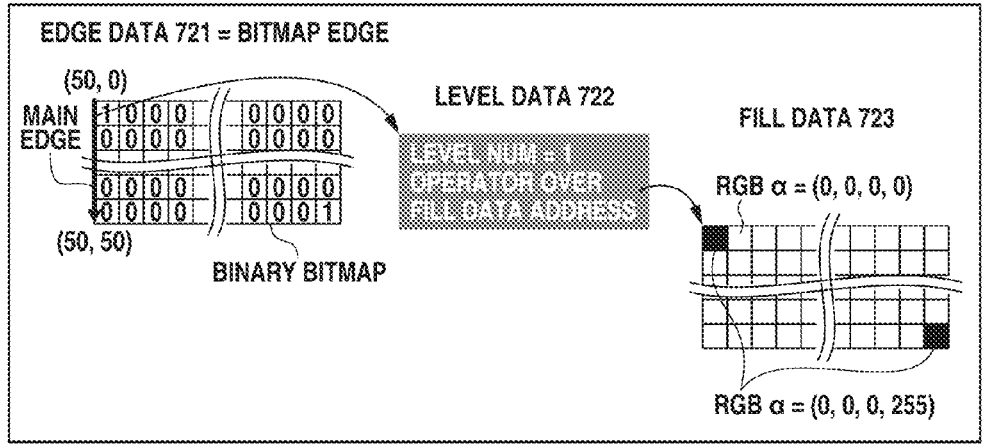

Such intermediate data generation processing will be described with reference to FIG. 7B. In the following description, the intermediate data generation processing will be described, assuming that this processing generates the intermediate data containing the bitmap edge when the source image data is the image data 701.

First, the intermediate data generation unit 210 generates a binary bitmap having the same size as the size (the width and the height) of the image data indicated by the source image data. Each of pixels contained in this binary bitmap corresponds to each of the pixels contained in the image data indicated by the source image data. In other words, a pixel located at a coordinate position (X, Y) in the binary bitmap corresponds to a pixel located at a coordinate position (X, Y) in the image data indicated by the source image data.

Then, the intermediate data generation unit 210 refers to the α value of each of the pixels contained in the image data indicated by the source image data. If the α value indicates that the pixel is transparent (i.e., if the α value is the specific alpha value), the intermediate data generation unit 210 sets the bit of the pixel located at the corresponding position in the binary bitmap to "0". On the other hand, if the α value indicates that the pixel is translucent or opaque (i.e., if the α value is different than the specific alpha value), the intermediate data generation unit 210 sets the bit of the pixel located at the corresponding position in the binary bitmap to "1". The bit "0" or the bit "1" set to each of the pixels in the binary bitmap is information indicating whether the rendering is omitted or performed on the pixel in the image data indicated by the source image data that is located at the position corresponding to the pixel in the binary bitmap. In other words, the binary bitmap with the bit set to each of the pixels is information indicating the region to be not rendered and the region to be rendered in the image data indicated by the source image data.

Next, the intermediate data generation unit 210 calculates an edge indicating the position of the left end of the object from the coordinate data contained in the path data, and generates this edge as the main edge.

The intermediate data generation unit 210 adds the generated binary bitmap and main edge into edge data 721. Then, the intermediate data generation unit 210 generates level data 722 and fill data 723, similarly to the level data 322 and the fill data 323 in the display list 320. Lastly, the intermediate data generation unit 210 enables the level data 722 to be referred to from the edge data 721 and the fill data 723 to be referred to from the level data 722, thereby generating a display list 720 containing the bitmap edge. This fill data 723 is the bitmap image data 701 containing the plurality of pixels each having the α value.

Figure 7C:
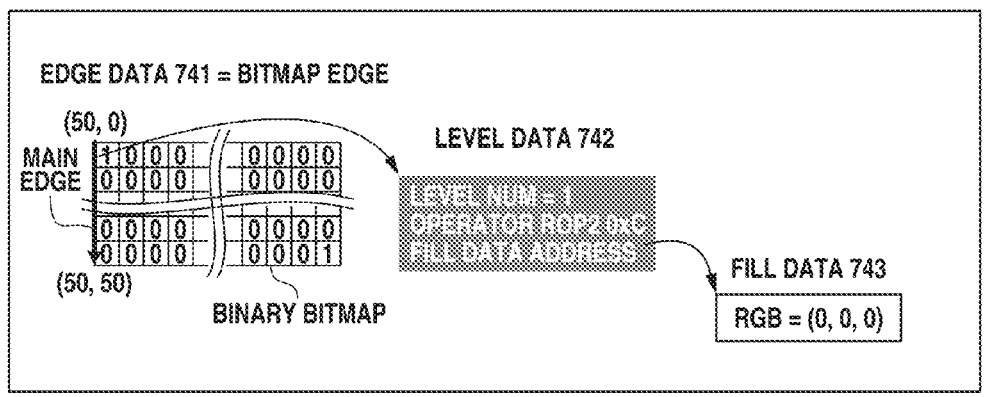

The method for generating the display list containing the bitmap edge is not limited to the above-described example, and a method for generating a display list 740 illustrated in FIG. 7C may be added. The generation of edge data 741 is similarly to the generation of the edge data 721, and therefore a description thereof will be omitted here. The intermediate data generation unit 210 refers to the α value of each of the pixels contained in the image data indicated by the source image data, and generates level data 742 and fill data 743 if checking that there is not an α value indicating that the pixel is translucent. The level data 742 contains a "0×C" operator, which instructs the rendering unit 215 to overwrite the background pixel. Further, if the color value is the same among the pixels each having the α value indicating that this pixel is opaque in the image data indicated by the source image data, the intermediate data generation unit 210 generates a monochrome fill having this color value (Example: RGB=(0, 0, 0)) as the fill data 743. On the other hand, if the color value is different among the pixels each having the α value indicating that this pixel is opaque in the image data indicated by the source image data, the intermediate data generation unit 210 generates the image data with the α channel removed from the image data indicated by the source image data, as the fill data 743. Generating such a display list allows the rendering unit 215 to perform the rendering processing only on the pixels in the active region while omitting the α blending more complex than overwriting from this rendering processing.

The rendering unit 215 renders the display list, containing the bitmap edge, which is generated in this manner by the above-described method. More specifically, the rendering unit 215 generates an edge based on the switching between the bit set to "0" and the bit set to "1" in the binary bitmap contained in the bitmap edge, and renders the active region while omitting the rendering of the inactive region acquired from this edge. The rendering of the active region is performed based on the fill data contained in the display list. More specifically, if the image data having the α value is specified in the fill data, this leads to the rendering with use of the α blending, and, in step S513, the intermediate data generation unit 210 generates the intermediate data using the vector edge like the vector edge illustrated in FIG. 3C. More specifically, for the bitmap image data containing the α channel, the intermediate data generation unit 210 sets a pair of downward and upward edges indicating the positions of the both ends of this bitmap image data as the vector edge, and generates intermediate data containing this vector edge. The fill data in the intermediate data in this case is exactly the bitmap image data containing the α channel itself. The rendering unit 215 renders the display list containing the vector edge by the above-described method. More specifically, if the image data is the bitmap image data containing the α channel, the rendering unit 215 renders each of the pixels by the α blending in the active region between the both ends of the vector edge. This means that the α blending is performed on the transparent pixel as well as the opaque pixel. In other words, generating the intermediate data using the vector edge includes the intermediate data generation unit 210 generating information indicating that each of the pixels contained in the bitmap image data will be rendered (will be subject to the rendering processing).

Since the generation of the intermediate data corresponding to the single page is completed, in step S514, the rendering unit 215 performs the rendering processing based on the generated intermediate data. Such rendering processing is performed based on the type of the edge data (the vector edge, the bitmap edge, or the like) of the object that is expressed in the intermediate data. The method for the rendering processing based on each type of the edge data is as described above. The bitmap image data corresponding to the single page is generated by this rendering processing. Then, the rendering unit 215 stores the bitmap image data corresponding to the single page into the data storage unit 150. Then, the processing returns to step S502. This stored bitmap image data is supplied to the printer device 130 by the job control unit 200.

FIG. 6 is a detailed flow of the α determination processing in step S509 illustrated in FIG. 5.

This α determination processing is performed to check whether not so many edges will be generated in the rendering processing even when the edge data is generated as the bitmap edge. This is because, if too many edges are generated in the rendering processing, a demerit of a cost increase derived from edge processing in the rendering processing overweighs a merit attained from performing the rendering processing only on the active region.

In step S601, the intermediate data generation unit 210 initializes both the "bitmap edge generation flag" and a "count value Cnt", which are variables, to "0". Then, the processing proceeds to step S602.

In step S602, the intermediate data generation unit 210 selects a determination line or determination lines in the bitmap image data. This determination line or each of these determination lines is a scan line in the bitmap image data, and is a scan line containing a plurality of pixels for which the α value will be analyzed in steps S605 and S606, which will be described below. Selecting the determination line(s) allows the α determination processing to be performed with a smaller calculation amount than analyzing the α value of each of pixels contained in all scan lines. The determination line(s) is or are at least one or more scan line(s), and the determination line or each of the determination lines of this or these at least one or more scan line(s) corresponds to a predetermined region where the α value held by the pixel will be analyzed. If the height of the bitmap image data is H (pixels), this or these determination line(s) is or are, for example, a first line, an [H/2]-th line, and/or an H-th line. The notation [•] is a gauss symbol, and [H/2] means a largest integer not greater than H/2. The method for selecting the determination line(s) is not limited thereto. Then, the processing proceeds to step S603.

In step S603, the intermediate data generation unit 210 reads a single line among unprocessed lines sequentially, starting from the first line in the bitmap image data containing the α channel, into a buffer in the RAM. Each of the pixels contained in the read line has the RGBα value. Then, the processing proceeds to step S604.

In step S604, the intermediate data generation unit 210 determines whether the line read in step S603 is the determination line selected in step S602. If the read line is the determination line (YES in step S604), the processing proceeds to step S605. If not (NO in step S604), the processing proceeds to step S607.

In step S605, the intermediate data generation unit 210 reads the α value of each of the pixels contained in the single line read in step S603 into another buffer in the RAM. In this reading, the α value held by each of the pixels is read into the buffer in a same arrangement order as an arrangement order of the pixels contained in the read line. Then, the processing proceeds to step S606.

In step S606, the intermediate data generation unit 210 counts the number of position(s) (boundary position(s)) where the pixel having the α value indicating that this pixel is transparent and another pixel are adjacent to each other (how many times the α value indicating that the pixel is transparent is switched) in the line read in step S603. Another pixel means the pixel having the α value indicating that this pixel is translucent or opaque. Then, the intermediate data generation unit 210 adds the counted number to the count value Cnt. Then, the processing proceeds to step S607.

This counting will be described with reference to FIG. 7A. The number is counted as "1" in a first line in the image data 701. On the other hand, the number is counted as "199" in a first line in the image data 702, because the α value indicating that the pixel is transparent is switched for each pixel in the object having the width of 200 pixels.

In step S607, the intermediate data generation unit 210 determines whether all lines contained in the bitmap image data are processed. If the α determination is completed for the all lines (NO in step S607), the processing proceeds to step S608. If not (if there is an unprocessed line) (YES in step S607), the processing returns to step S603.

In step S608, the intermediate data generation unit 210 calculates an edge density. The edge density corresponds to a ratio of the number of edge(s) contained in the bitmap image data to the area of the bitmap image data, and is defined by the following expression.

EDGE DENSITY=((COUNT VALUE Cnt)÷(IMAGE WIDTH×NUMBER OF DETERMINATION LINE(S)))

In the present exemplary embodiment, in the case of the image data 701, the count value Cnt is a cumulative total "2 (=1+0+1)" of the first line, a twenty-fifth line, and a fiftieth line. The image width is "200", and the number of determination line(s) is "3". Therefore, the edge density is determined to be the edge density=(2)÷(200×3)=0.0033. On the other hand, in the case of the image data 702, the count value Cnt is a cumulative total "597 (=199+199+199)" of the first line, a twenty-fifth line, and a fiftieth line. The image width is "200", and the number of determination line(s) is "3". Therefore, the edge density is determined to be the edge density=(597)÷(200×3)=0.995.

The processing proceeds to step S609, in which the intermediate data generation unit 210 determines whether the edge density is a threshold value or higher. If the edge density is lower than the threshold value (i.e., if a small number of edges will be generated in the rendering processing when the edge data is generated as the bitmap edge) (NO in step S609), the processing proceeds to step S610, in which the intermediate data generation unit 210 sets the "bitmap edge generation flag" to "1". If the edge density is the threshold value or higher (i.e., if a large number of edges will be generated in the rendering processing when the edge data is generated as the bitmap edge) (YES in step S609), the intermediate data generation unit 210 ends the α determination processing with the "bitmap edge generation flag" remaining set to the initial value "0".

Figure 8A:
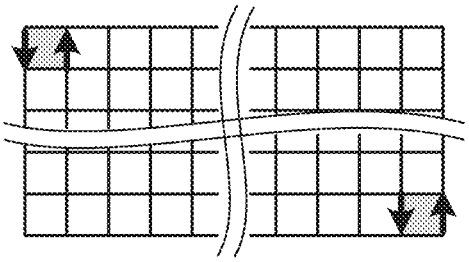
FIGS. 8A, 8B, and 8C illustrate a difference made when a vector edge and the bitmap edge are switched with respect to the first exemplary embodiment.

FIG. 8A illustrates edges 801 generated in the processing for rendering the image data 701. The edge data contained in the display list of this image data 701 is the bitmap edge. As understood from the edges 801, two downward edges and two upward edges are generated in the rendering processing. Since the generated edges are four, the edge processing spends only a low cost. Further, the rendering unit 215 does not perform the processing for rendering the image data 701 on the inactive region, which can speed up the processing.

Figure 8B:
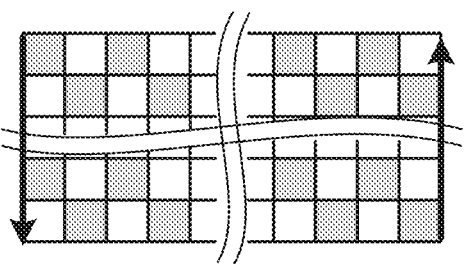

FIG. 8B illustrates edges 802 generated in the processing for rendering the image data 702. The edge data contained in the display list of this image data 702 is the vector edge. As understood from the edges 802, one downward edge and one upward edge are generated in the rendering processing.

Figure 8C:
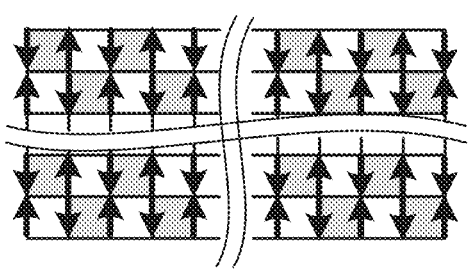

Supposing that this image data 702 is processed by the rendering processing with use of the bitmap edge, FIG. 8C illustrates edges 803 generated in this case. In the image data 702, the transparent pixel and the opaque pixel are arranged alternately per pixel, so that an enormous number of edges are generated by the rendering processing with use of the bitmap edge. Therefore, the edge processing spends an excessively increased cost, and therefore this method is inefficient. For this reason, the image data 702 is processed by the rendering processing with use of the vector edge.

In the present exemplary embodiment, the image forming apparatus 100 switches whether to perform the rendering processing with use of the vector edge or perform the rendering processing with use of the bitmap edge according to the α value held by the pixel contained in the image data having the α channel. This method allows the image forming apparatus 100 to omit the α blending on the inactive region while avoiding the increase in the cost spent to process the edge in the rendering processing.

In other words, according to the present exemplary embodiment, more flexible omission of the α blending can be achieved by, when rendering an image, omitting the α blending on a certain portion in this image while performing the α blending on another portion in this image.

In the above-described exemplary embodiment, the PDL data is assumed to be received from the host computer 170 via the LAN 160. However, the image forming apparatus 100 may include a not-illustrated universal serial bus (USB) memory socket, and the control device 110 may read out the PDL data directly from a USB memory inserted in this socket. In this case, each of the above-described processing procedures may be performed after the read PDL data is stored into the data storage unit 150, or may be performed with this USB memory regarded as the data storage unit 150.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-229911, filed Nov. 12, 2014, which is hereby incorporated by reference herein in its entirety.

What is claimed is:

1. An image processing apparatus capable of generating a composite image by combining plural images at least including a foreground image and a background image, the image processing apparatus comprising:

at least one controller including a processor configured to execute a program stored in a memory or a circuit configured to implement a function, the at least one controller being configured to:

generate, in a case where the foreground image includes a plurality transparent pixels and a plurality of semi-transparent pixels and an arrangement state of the transparent pixels is a first arrangement state in the foreground image, the composite image by performing alpha blending to combine a semi-transparent pixel in the foreground image with a pixel in the background image and also performing alpha blending to combine a transparent pixel in the foreground image with a pixel in the background image; and generate, in a case where the foreground image includes a plurality of transparent pixels and a plurality of semi-transparent pixels and the arrangement state of the transparent pixels is a second arrangement state in the foreground image, the second arrangement state being different from the first arrangement state, the composite image by performing alpha blending to combine a semi-transparent pixel in the foreground image with a pixel in the background image and not performing alpha blending to combine a transparent pixel in the foreground image with a pixel in the background image.

2. The image processing apparatus according to claim 1, wherein the at least one controller is capable of performing:
   a first generation process of generating the composite image by performing alpha blending to combine a semi-transparent pixel in the foreground image with a pixel in the background image and also performing alpha blending to combine a transparent pixel in the foreground image with a pixel in the background image; and
   a second generation process of generating the composite image by performing alpha blending to combine a semi-transparent pixel in the foreground image with a pixel in the background image and not performing alpha blending to combine a transparent pixel in the foreground image with a pixel in the background image, and
   wherein the at least one controller determines, based on the foreground image, which of the first generation process and the second generation process is to be performed.

3. The image processing apparatus according to claim 2, wherein the at least one controller determines, based on a value related to a number of transparent pixels in the foreground image, which of the first generation process and the second generation process is to be performed.

4. The image processing apparatus according to claim 2, wherein the at least one controller determines, based on an edge density in the foreground image, which of the first generation process and the second generation process is to be performed.

5. The image processing apparatus according to claim 4, wherein the edge density is a value related to a number of transparent pixels adjacent to non-transparent pixels and/or a number of non-transparent pixels adjacent to transparent pixels.

6. The image processing apparatus according to claim 4, wherein the at least one controller performs, to obtain the edge density, an edge detection process on scan lines that are a part of all scan lines in the foreground image.

7. The image processing apparatus according to claim 1, wherein, in a case where the arrangement state of the transparent pixels is the first arrangement state, the at least one controller performs alpha blending to combine a pixel in the foreground image with a pixel in the background image without distinguishing transparent pixels and non-transparent pixels included in the foreground image,
   wherein, in a case where the arrangement state of the transparent pixels is the second arrangement state, the at least one controller distinguishes transparent pixels and non-transparent pixels included in the foreground image and performs alpha blending to combine only the non-transparent pixels with pixels in the background image.

8. The image processing apparatus according to claim 7, wherein the non-transparent pixels include a semi-transparent pixel and an opaque pixel.

9. The image processing apparatus according to claim 1, wherein the at least one controller generates the composite image by, based on an area of the foreground image being smaller than a predetermined value, performing alpha blending to combine a semi-transparent pixel in the foreground image with a pixel in the background image and performing alpha blending to combine a transparent pixel in the foreground image with a pixel in the background image.

10. The image processing apparatus according to claim 1, further comprising an image forming unit configured to form an image on a sheet,
    wherein the at least one controller causes the image forming unit to perform image formation based on the composite image.

11. The image processing apparatus according to claim 1, wherein, in a case where the arrangement state of the transparent pixels is the second arrangement state, the at least one controller manages a pixel to be subjected to alpha blending and a pixel not to be subjected to alpha blending by using a binary bitmap.

12. The image processing apparatus according to claim 1, wherein the at least one controller obtains the foreground image and the background image based on XPS (Extensible Markup Language Paper Specification) data or PDL (Page Description Language) data.

13. A method of generating a composite image by combining plural images at least including a foreground image and a background image, the method comprising:
    generating, in a case where the foreground image includes a plurality transparent pixels and a plurality of semi-transparent pixel and an arrangement state of transparent pixels is a first arrangement state in the foreground image, the composite image by performing alpha blending to combine a semi-transparent pixel in the foreground image with a pixel in the background image and also performing alpha blending to combine a transparent pixel in the foreground image with a pixel in the background image; and
    generating, in a case where the foreground image includes a plurality of transparent pixels and a plurality of semi-transparent pixels and the arrangement state of the transparent pixels is a second arrangement state in the foreground image, the second arrangement state being different from the first arrangement state, the composite image by performing alpha blending to combine a semi-transparent pixel in the foreground image with a pixel in the background image and not performing alpha blending to combine a transparent pixel in the foreground image with a pixel in the background image.

14. The method according to claim 13, further comprising:
    determining, based on the foreground image, which of the first generation process and the second generation process is to be performed.

15. The method according to claim 13,
    in a case where the foreground image includes a transparent pixel and a semi-transparent pixel and the arrangement state of the transparent pixels is the first arrangement state, performing alpha blending to combine a pixel in the foreground image with a pixel in the background image without distinguishing transparent pixels and non-transparent pixels included in the foreground image, and in a case where the foreground image includes a transparent pixel and a semi-transparent pixel and the arrangement state of the transparent pixels is the second arrangement state, distinguishing transparent pixels and non-transparent pixels included in the foreground image and performs alpha blending to combine only the non-transparent pixels with pixels in the background image.

16. The method according to claim 13, further comprising generating the composite image by, based on an area of the foreground image being smaller than a predetermined value, and performing alpha blending to combine a semi-transparent pixel in the foreground image with a pixel in the background image and performing alpha blending to combine a transparent pixel in the foreground image with a pixel in the background image.

17. A non-transitory computer-readable recording medium storing a program for causing a controller of an image processing apparatus to execute control processing, the image processing apparatus being capable of generating a composite image by combining plural images at least including a foreground image and a background image, the control processing comprising:

generating, in a case where the foreground image includes a plurality of transparent pixels and a plurality of semi-transparent pixel and an arrangement state of transparent pixels is a first arrangement state in the foreground image, the composite image by performing alpha blending to combine a semi-transparent pixel in the foreground image with a pixel in the background image and also performing alpha blending to combine a transparent pixel in the foreground image with a pixel in the background image; and generating, in a case where the foreground image includes a plurality of transparent pixel and a plurality of semi-transparent pixel and an arrangement state of the transparent pixels is a second arrangement state in the foreground image, the second arrangement state being different from the first arrangement state, the composite image by performing alpha blending to combine a semi-transparent pixel in the foreground image with a pixel in the background image and not performing alpha blending to combine a transparent pixel in the foreground image with a pixel in the background image.

18. The non-transitory computer-readable recording medium according to claim 17, further comprising:
  determining, based on the foreground image, which of the first generation process and the second generation process is to be performed.

19. The non-transitory computer-readable recording medium according to claim 17, further comprising:
  in a case where the arrangement state of the transparent pixels is the first arrangement state, performing alpha blending to combine a pixel in the foreground image with a pixel in the background image without distinguishing transparent pixels and non-transparent pixels included in the foreground image, and
  in a case where the arrangement state of the transparent pixels is the second arrangement state, distinguishing transparent pixels and non-transparent pixels included in the foreground image and performs alpha blending to combine only the non-transparent pixels with pixels in the background image.

20. The non-transitory computer-readable recording medium according to claim 17, further comprising generating the composite image by, based on an area of the foreground image being smaller than a predetermined value, and performing alpha blending to combine a semi-transparent pixel in the foreground image with a pixel in the background image and performing alpha blending to combine a transparent pixel in the foreground image with a pixel in the background image.

* * * * *